United States Patent [19]

Siio

[11] Patent Number: 5,943,042
[45] Date of Patent: Aug. 24, 1999

[54] CONTROL METHOD AND SYSTEM FOR OBJECTS ON A COMPUTER

[75] Inventor: Itiro Siio, Yokohama, Japan

[73] Assignee: International Business Machines Corporation, Armonk, N.Y.

[21] Appl. No.: 08/539,391

[22] Filed: Oct. 5, 1995

[30] Foreign Application Priority Data

Oct. 7, 1994 [JP] Japan .................................. 6-243919

[51] Int. Cl.[6] ........................................................ G09G 5/00
[52] U.S. Cl. ............................ 345/172; 345/169; 341/23
[58] Field of Search .................................. 345/156, 146, 345/157, 163, 169, 172; 341/21–23

[56] References Cited

U.S. PATENT DOCUMENTS

| | | | |
|---|---|---|---|
| 5,347,628 | 9/1994 | Brewer et al. | 395/159 |
| 5,453,758 | 9/1995 | Sato | 345/156 |
| 5,481,265 | 1/1996 | Russell | 345/169 |
| 5,670,987 | 9/1997 | Doi et al. | 345/156 |

FOREIGN PATENT DOCUMENTS

| | | |
|---|---|---|
| 4-299726 | 10/1992 | Japan . |
| 6-35923 | 2/1994 | Japan . |

*Primary Examiner*—Amare Mengistu
*Attorney, Agent, or Firm*—Kevin M. Jordan

[57] ABSTRACT

To virtually connect an object stored on a computer with real work as if they were physically connected and to make easy the operation of a computer. In one embodiment, visitors to a museum which incorporates a computer system according to the present invention are given a wireless mouse in which an ID is stored corresponding to an object stored in the computer. The visitor simply operates the mouse near a terminal computer provided in each exhibition booth of the museum to display a file corresponding to the ID the monitor of the terminal. The displayed file is under the exclusive control of the visitor to and may include an edit function. In an edit booth, the visitor may finally edit the information recorded in each exhibition booth, print it out, return the wireless mouse, and exit the museum.

8 Claims, 9 Drawing Sheets

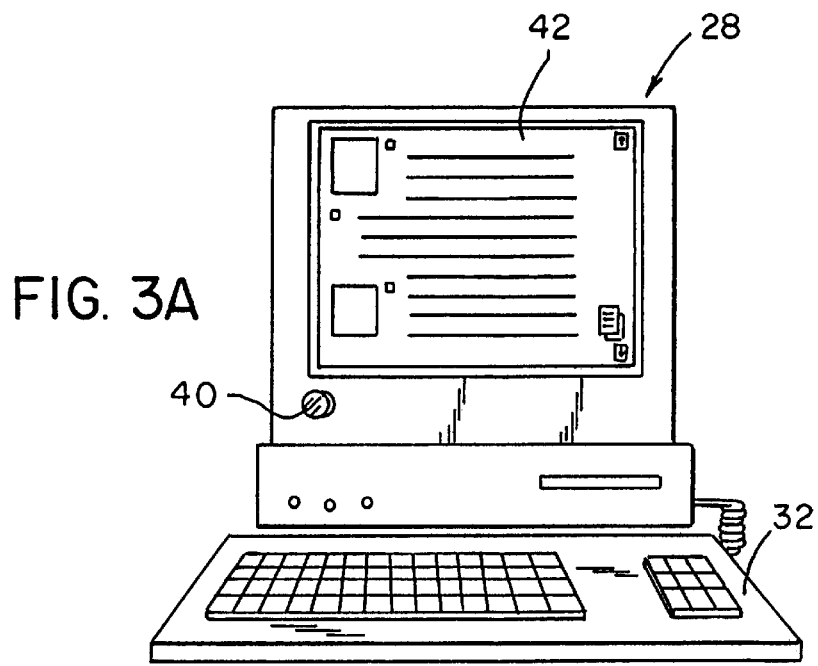
FIG. 3A
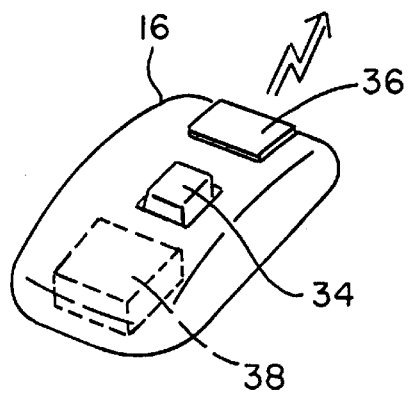
FIG. 3B
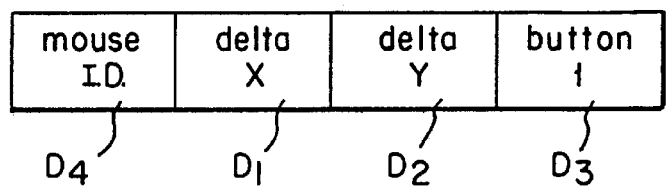

CONTROL METHOD AND SYSTEM FOR OBJECTS ON A COMPUTER

FIELD OF THE INVENTION

The present invention relates to a control method and system for controlling the calling, opening, and closing of an object stored in a computer.

BACKGROUND OF THE ART

When an object is typically opened on the monitor of a computer, the name of the object is input via a keyboard to open it. An "object" used herein is intended to mean a combination of data and the access means therefor. After a directory (of registered objects) has been displayed, any of the registered objects may be selected by entering a command. Further operations to be performed after the object has been opened are also typically input via keyboard. In many cases operations such as this are difficult to handle unless an operator has detailed knowledge of the application, e.g., through a technical manual. This has limited the number of people willing and able to work with computers.

More recently, as a supplement to a keyboard, there has recently been developed a so-called graphical user interface (GUI) in which an object can be opened and closed and commands can be input by using a "mouse" device. The mouse is usually connected through a wire to the computer. The mouse may be moved on a board thereby moving a cursor on the monitor of a computer. A typical GUI also utilizes icons which represent an object and are displayed on the monitor. Thus the mouse may be used to select an object displayed on the monitor and perform limited operations on it. GUIs have greatly simplified computer operations for the average user. In addition, a wireless mouse has recently been developed, thereby expanding the operational range and enhancing operability.

However, in the above-described conventional mouse (including wireless mice, the pointer (which is used to select an object and normally displayed as an arrow) on the monitor is moved and only the function of the object selected by the pointer is performed, so the mouse is limited to acting as a simple input device.

For example, when you actually do work (for example, when you telephone), the actual work of operating the telephone is not connected to the act of opening an object on a computer and viewing the data content of the object, in a case where the data (e.g., telephone directory) required of this work have been registered as objects on a computer.

One proposal has been to project each icon of objects to be displayed on the monitor of a normal computer with the use of a TV projector or liquid crystal overhead projector (OHP) device, to provide a pointing device movable on a work table, and to put the pointing device on a projected image to open the object (reference: Pierre Wellner, "The Digital Desk Calculator and Tangible Manipulation on a Desk Top Display," ACM, UIST'91, Nov. 11–13, 1991). In this case however, as before, the pointing device is limited to conventional input functions.

Consider, for example, the context of a museum wherein a conventional computer system is installed. Data on exhibits are classified, a password may be set for each classification. A one-way information provision may be made such that data is output after input of the password by the visitor. However, this method has not come to meet requirements such that visitors can interactively access the data on the computer. Thus, even in these days where words such as "multi-media" and "virtual reality" have been recited like the buzzwords of the times, the realization of connecting a computer to more realistic work has been difficult.

SUMMARY OF THE INVENTION

In view of the above, an object of the present invention is to provide a control method and system for an object on a computer which is capable of virtually connecting the computer with real work as if they were physically connected and enable more easy operation of the computer.

An embodiment of a method according to the invention as set forth in claim 1 discloses a method for controlling an object in a computer system having a display device, a memory storing an object including associated data, and a physical pointing device. An "object" as used herein means a combination of data and the access means therefor. The method of claim 1 comprises the steps of: displaying an image corresponding to the object onto the display device; communicating an identifier which corresponds with the object, to the computer system, responsive to user input to the physical pointing device wherein the identifier is stored; directly associating the physical pointing device with the object as a function of the identifier; displaying the associated data, responsive to user input to the physical pointing device and the step of directly associating; and executing a command instruction with respect to the associated data.

According to the invention as set forth in claim 1, an object on a computer, i.e., an image, which does not exist really and is only a display, is related to (responsive to) a physical pointing device. This relating is performed by an instruction from the pointing device and can also be released. Also, in the related state, that object can be opened or closed, and in the open state a command can be executed.

For example, if this pointing device is a wireless and small device, a user can put it into a pocket and handle it as if a specific object (e.g., files on which confidential documents were recorded, etc.) were held with a clip and stored.

BRIEF DESCRIPTION OF THE DRAWINGS

These and other features, aspects, and advantages of the present invention will become better understood with regard to the following description, appended claims, and accompanying drawings where:

FIG. 3(A) is a schematic view showing the relationship between a wireless mouse and a terminal equipment;

FIG. 3(B) is a diagram showing the data format to be sent by the wireless mouse;

DESCRIPTION

Figure 1:
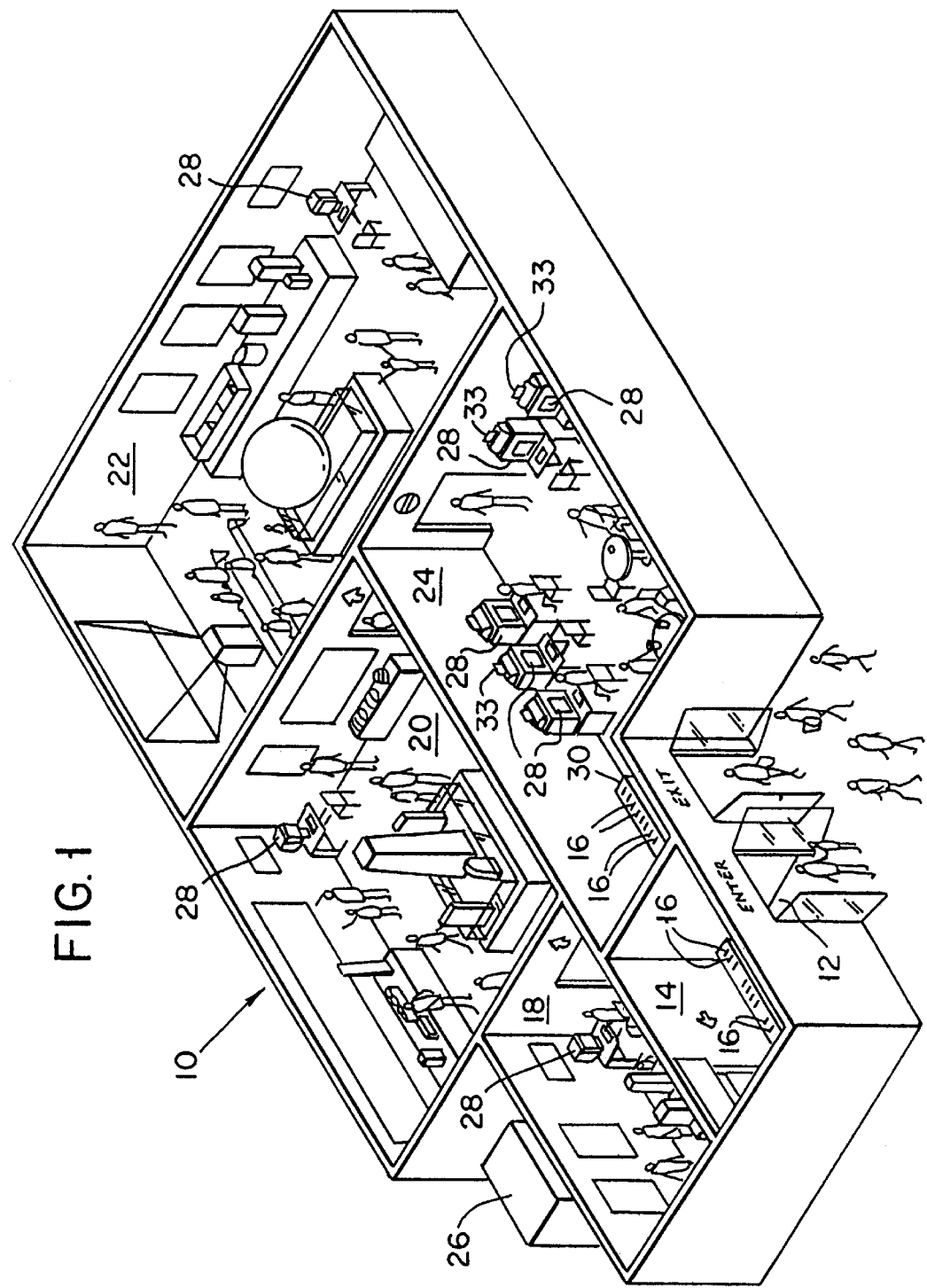
FIG. 1 is a perspective view showing the internal layout of a museum incorporating a computer system according to the present invention.

FIG. 1 shows a museum 10 to which the present invention was applied. This museum 10 is provided with an information booth 14 next to an entrance 12, and a visitor receives at this information booth 14 a wireless mouse 16 which is pointing device according to a first embodiment of the present invention. This wireless mouse 16 will be described later.

The museum 10 is provided with first to third exhibition booths 18, 20, and 22, in addition to the information booth 14. In each of the exhibition booths 18, 20, and 22, an exhibition along each theme is performed. The visitors usually pass through the first exhibition booth 18, the second exhibition booth 20, and the third exhibition booth 22 in the recited order, and is finally guided to an edit booth 24.

Figure 2:
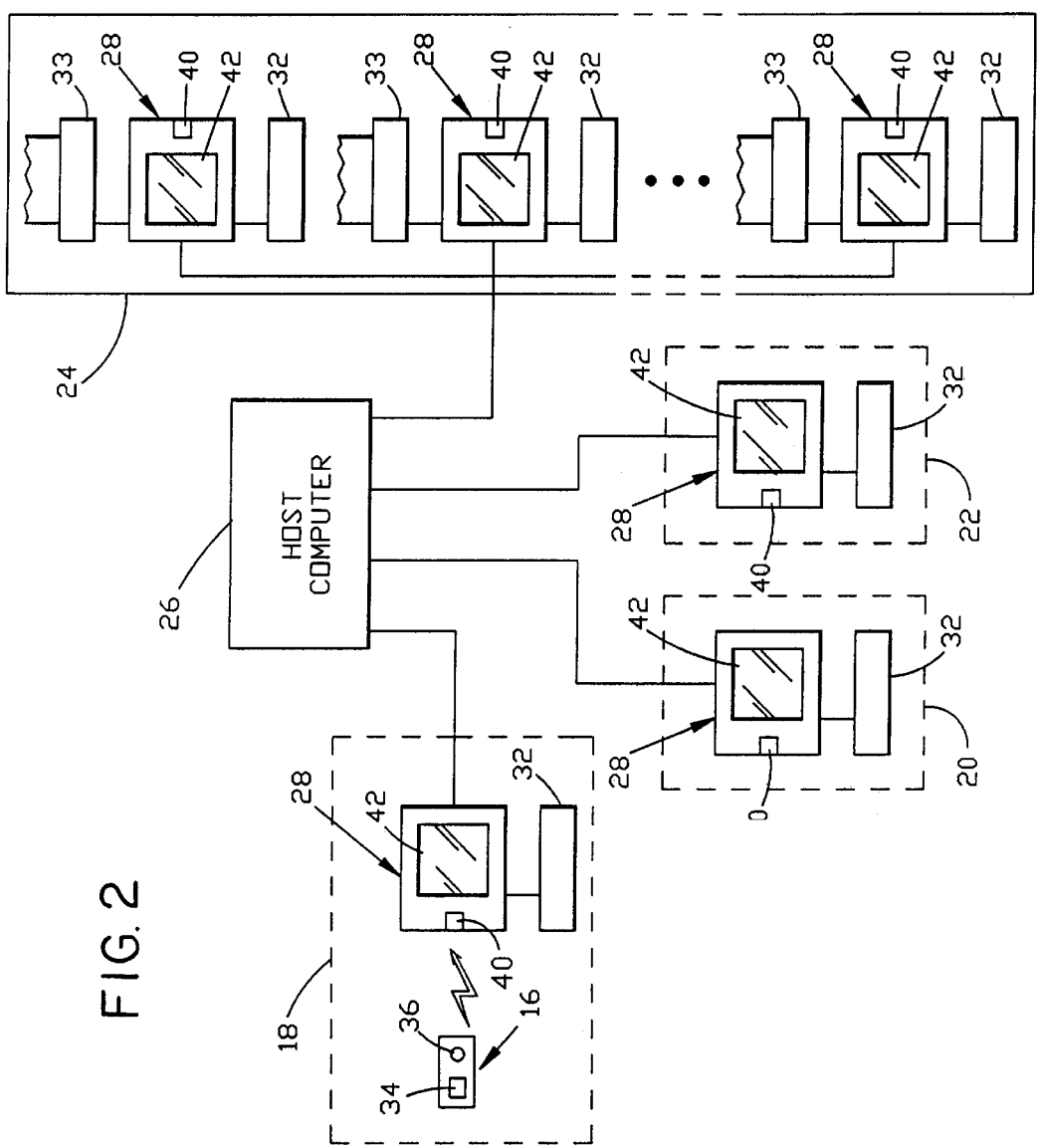
FIG. 2 is a block diagram of a computer network system according to the present invention as utilized in the museum illustrated in FIG. 1.
Figure 2A:
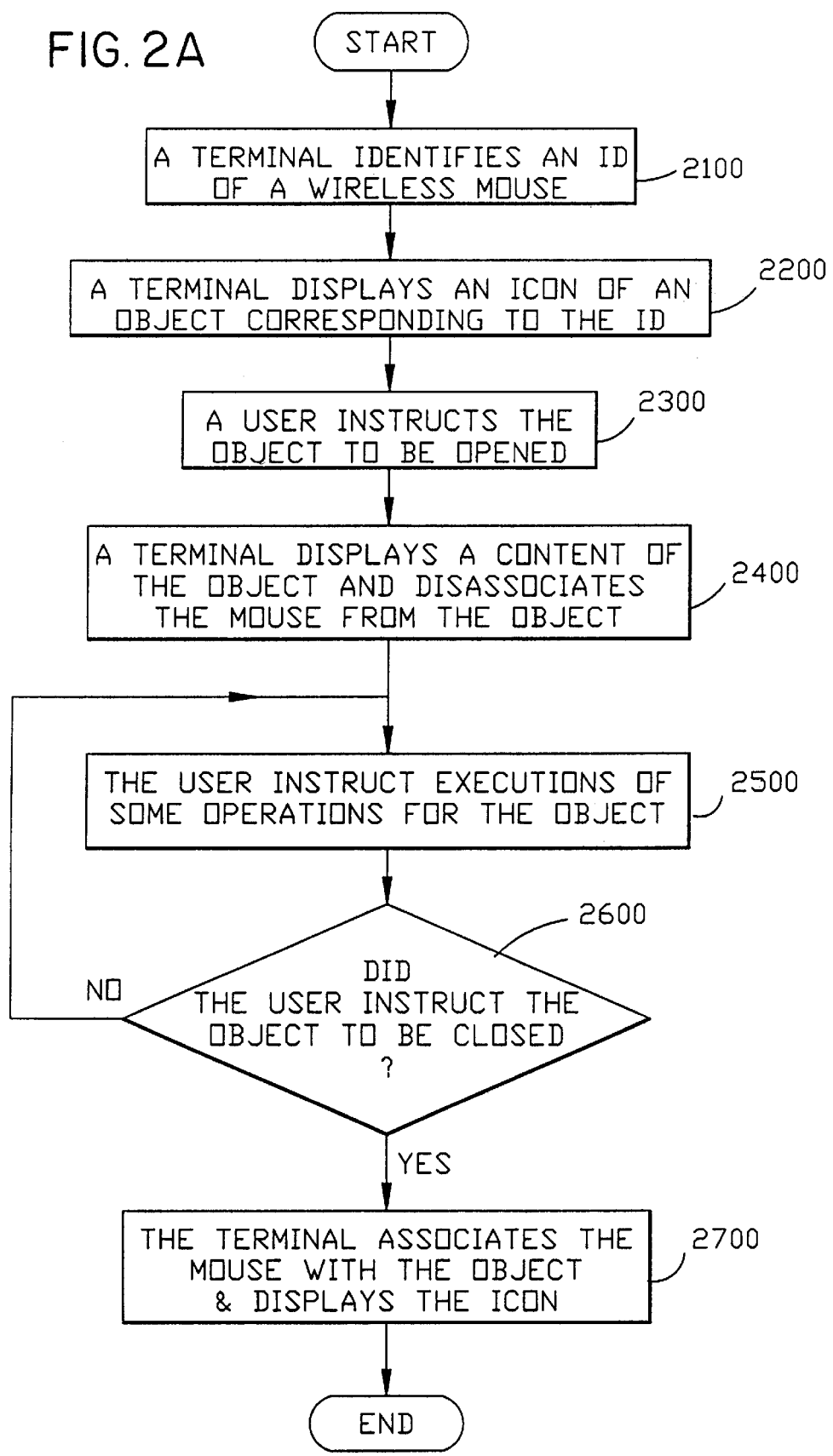
FIG. 2a is a flowchart of a method which corresponds to the block diagram of FIG. 2.

In the exhibition booths 18, 20, and 22 there are installed a plurality of terminal computers 28 which are interconnected with a host computer 26 (FIG. 2). The terminal computer 28 and the host computer 26 as a whole constitute a museum system. These terminal computer 28 are installed so that the visitors can freely operate them.

Also, in the edit booth 24 there are a plurality of terminal computer 28, which are also installed so that the visitors can freely operate them.

In a corner of the edit booth 24 there is provided a table 30 to which the wireless mouse 16 the visitor received at the information booth 14 is returned back, and the visitor puts the wireless mouse 16 on this table 30 and then goes out of the museum.

FIG. 2 shows the network system between the host computer 26 installed in this museum 10 and the terminal computer 28 provided in the booths 18, 20, 22, and 24.

In the host computer 26 there is stored information on the exhibits in the above-described museum 10, which can be accessed by the operation of the terminal computer 28.

A keyboard 32 is connected to the terminal computer 28 in each of the exhibition booths 18, 20, and 22, and a keyboard 32 and a printer 33 are connected to the terminal computer 28 in the edit booth 24.

In the wireless mouse 16 there has been registered the corresponding ID, which is controlled by the host computer 26 and connected with a memo object.

As shown in FIG. 3, the wireless mouse 16 is provided with an LED (light emitting diode) 36 that is lit by an operation button 34, the operation of this button 34, and the movement of the wireless mouse 16. The LED 36 emits light based on a pulse signal set by a control part 38 of the wireless mouse 16, and this light can transmit a specific ID.

More particularly, the data to be transferred by this wireless mouse 16 has a format such as the one shown in FIG. 3(B), in which ID data D4 is added to conventional data stream typically consisting of: delta X data D1 which indicates a difference of movement in an X direction; delta Y data D2 which indicates a difference of movement in a Y direction; and on-off data D3 responsive to the operation button 34. The ID data D4 (as well as the conventional data stream) can be communicated by user input of the operation button 34.

Additionally, each terminal 28 is coupled to with a light-receiving part 40 for receiving the light emitted from the wireless mouse 16, Referring again to FIG. 2, the terminal 28 is coupled to the host computer 26 and adapted to access a memo object which corresponds to the ID communicated from the mouse 16.

Preferably, the visitors are each provided with a mouse 16 which contains an ID D4 which corresponds to a different memo object. Thus, if a visitor operates the button 34 of a wireless mouse 16 to communicate his unique ID D4 which is detected by a terminal computer 28 in any of the booths 18, 20, 22, and 24, the icon of memo object corresponding to that visitor's mouse ID is displayed on the detecting terminal computer 28.

Figure 4A:
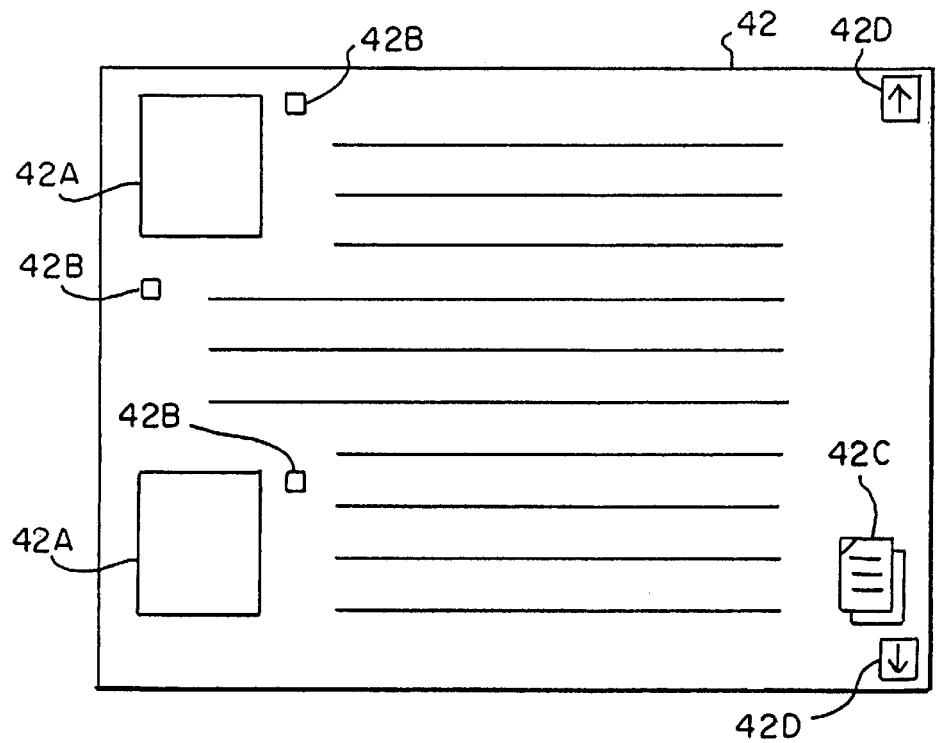
FIGS. 4(A) and 4(B) are schematic views showing an example of the screen (object) displayed on the monitor of a computer, respectively.

As shown in FIG. 4(A), the displayed memo object is displayed as an icon 42C on a monitor 42 of the terminal computer 28. If the wireless mouse 16 is moved, this icon 42C will follow it and move on the monitor 42. Also, desired data can be displayed on the monitor 42 by selecting the command bar of a retrieval tool (program (not shown)) with the operation (e.g., clicking) of the operation button 34 of the wireless mouse 16. FIG. 4(A) shows the state that desired data have been displayed, a photograph 42A and sentences 42B are displayed, and the display can also be moved up and down with a scroll arrow 42D.

Figure 4B:
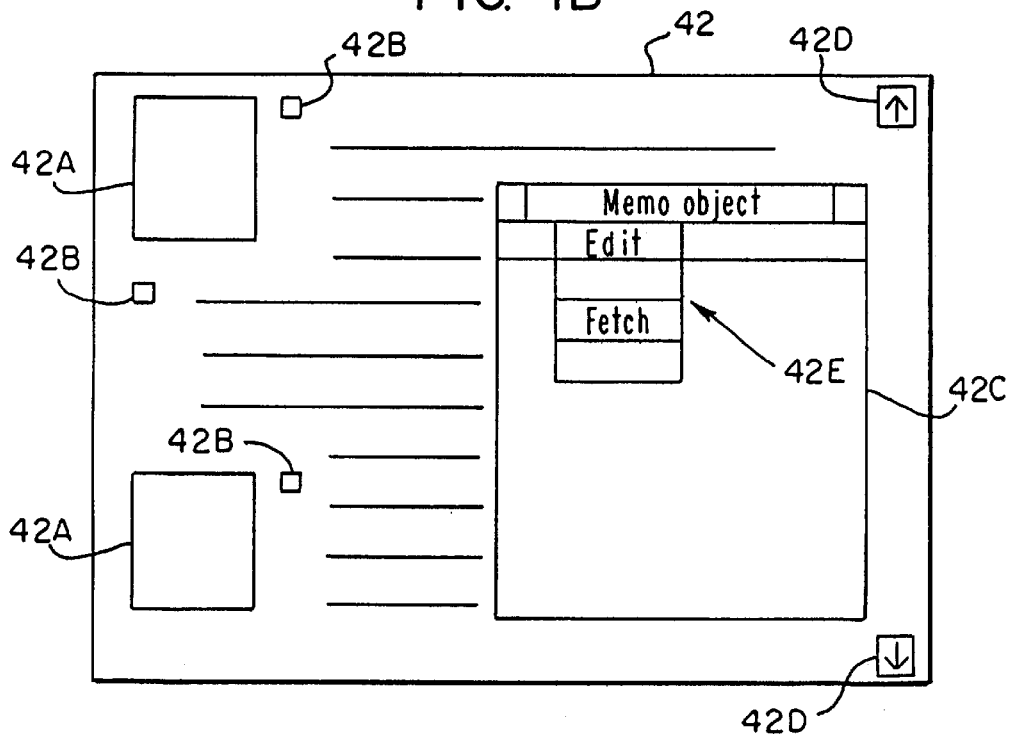

Now, if a memo object 42C is opened by operating (e.g., double-clicking) the operation button 34 of the wireless mouse 16, it will be displayed as shown in FIG. 4(B). When the memo object 42C is opened, a pointer 42E is displayed. This pointer 42E can perform conventional mouse operations. For example, if the sentence 42B is dragged and the "edit" in the pull-down menu and the "fetch" in the menu are selected with the pointer 42E, as shown in FIG. 4(B), the sentence 42B can be fetched to a desired position of the memo object 42C. It will be appreciated that the sentence 42B may merely be dragged to fetch it. Of course, the photograph 42A can also be fetched with an operation such as dragging.

The terminal equipment 28 in the edit booth 24 is connected with the printer 33. That is, in the edit booth 24, there can be printed out the data fetched and edited in each of the exhibition booths 18, 20, and 22 and stored in the file of the visitor himself. Thus, materials about the exhibits in the museum can be obtained by printing out necessary information at the edit booth, without taking notes of necessary information with the use of a writing tool or having pamphlets at each of the exhibition booths 18, 20, and 22.

The operation of the first embodiment will hereinafter be described. The visitor enters and receives a wireless mouse 16 at the information booth 14. In this wireless mouse 16 there is a preregistered ID D4. Similarly, a plurality of visitors are given wireless mice 16 in which different ID's have been preregistered.

If the visitor passes through the information booth 14, he or she will enter the first booth 18. The visitor then enters the second booth 20 and the third booth 22 in this order and views the exhibits exhibited in the respective exhibition booths 18, 20, and 22.

When the visitor wants to record information on an exhibit seen during this viewing, he or she previously would typically take notes of text written on panels provided near the exhibit or received pamphlets. However, in the first embodiment of the present invention, the visitor simply approaches a terminal 28 provided in each of the exhibition booths 18, 20, and 22, and operates the wireless mouse 16 he or she received at the information booth 14. The wireless mouse 16 then outputs a light signal encoded with the preregistered ID. This light signal is received by the light-receiving part 40 of the terminal computer 28, which identifies the ID. Based upon the received ID, the terminal computer 28 accesses the host computer 26 to display the icon of the memo object corresponding to this ID onto the monitor 42.

If the memo object is opened by operating the operation button 34, the wireless mouse 16 at that time will function as a conventional pointing device for moving the pointer displayed on the monitor 42 and issuing commands. More particularly, if the wireless mouse 16 is moved operating the operation button 34, the pointer will be moved according to the movement of this wireless mouse 16.

The opened memo object is an object for which a visitor has exclusive access via the wireless mouse 16. The object may be integrated with conventional edit and print functions. For example, sentences can be input via a word processor and a keyboard 32, or the information stored in the host computer 26 (server computer) can be read out and a desired portion can be printed, by means well known on the art.

In addition, if the memo object is integrated with one of many well known graphics programs, e.g., to import and/or edit images, an custom pamphlet can be dynamically constructed. Further, editing can be performed at the terminal computer 28 of the exhibition booth.

When the desired work is completed, the visitor can command the discontinue editing via the operation button 34 of the wireless mouse 16 and the memo object will again be iconized.

There are some cases where the visitor may move to another terminal computer 28 without closing the memo object on a previous terminal. In this case, when the current terminal computer 28 detects the same ID in the light signal of the wireless mouse 16, the memo object of the previous terminal computer 28 may be first iconized on the previous terminal prior to display on the present terminal computer. When iconized, the edited content is controlled and stored by the host computer 26.

The visitor may similarly repeat the above-described work at exhibition booths 18, 20 and 22 as needed and when finished, proceeds to the edit booth 24.

Preferably, the edit booth 24 contains a plurality of terminal computers 28, so that the operation button 34 of the wireless mouse 16 at any one will display his own or her own memo object, as in the case of the terminal computer 28 in the above-described exhibition booths 18, 20, and 22.

In edit booth 24, the information recorded in the exhibition booths 18, 20, and 22 can again be edited as desired. After any unnecessary information is deleted and the information is formatted as desired, the information may be printed out with the printer 33. When the printing is completed, the visitor takes his documents, returns the wireless mouse 16, and exits the museum.

Thus, unnecessary information can be eliminated dynamically, and eliminating the need to amass pamphlets that are typically distributed in the vicinity of each of the exhibits. Also, information that cannot be obtained during viewing of exhibits can also obtained simply and quickly.

Also, the obtained information can be edited there (edit booth 24 of the museum 10), so the information will be able to be utilized efficiently when it is reviewed later.

While in the first embodiment of the present invention a single terminal computer 28 has been provided in each of the exhibition booths 18, 20, and 22, it will be appreciated that a plurality of terminal computers may be provided. The museum 10 explained in the first embodiment may also include various kinds of permanent and temporary exhibitions and other facilities such as seen in a zoo.

A second embodiment of the present invention will hereinafter be described. For the same parts as the above-described first embodiment, the same reference numerals will be applied and a description of the same parts will not be given.

Figure 5A:
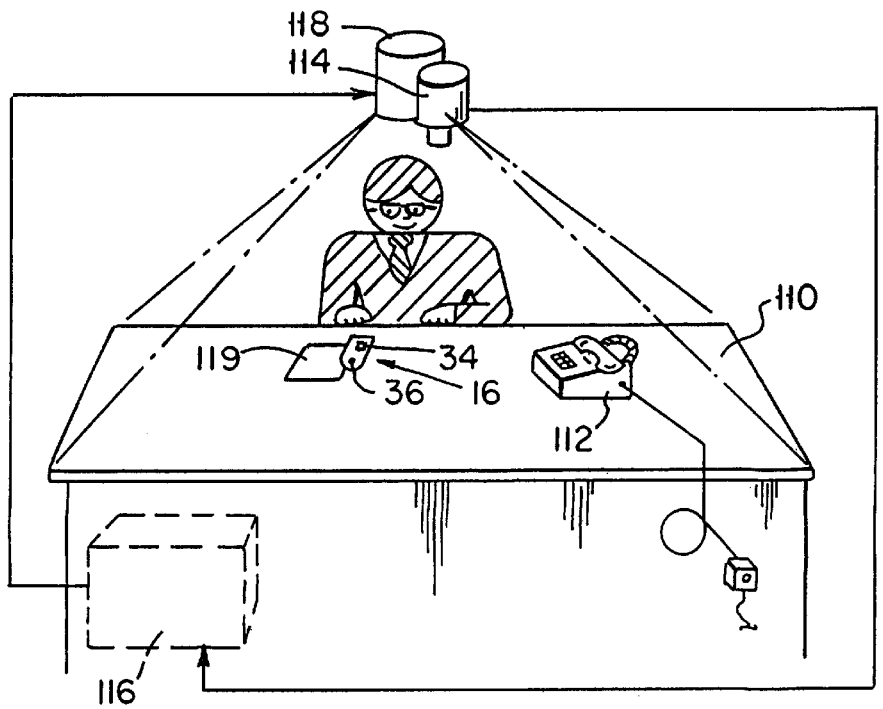
FIGS. 5(A) and 5(B) are schematic views showing the board and the peripheral equipment according to a second embodiment of the present invention, 5(A) showing the state before the object is opened and 5(B) showing the state after the object was opened.
Figure 5B:
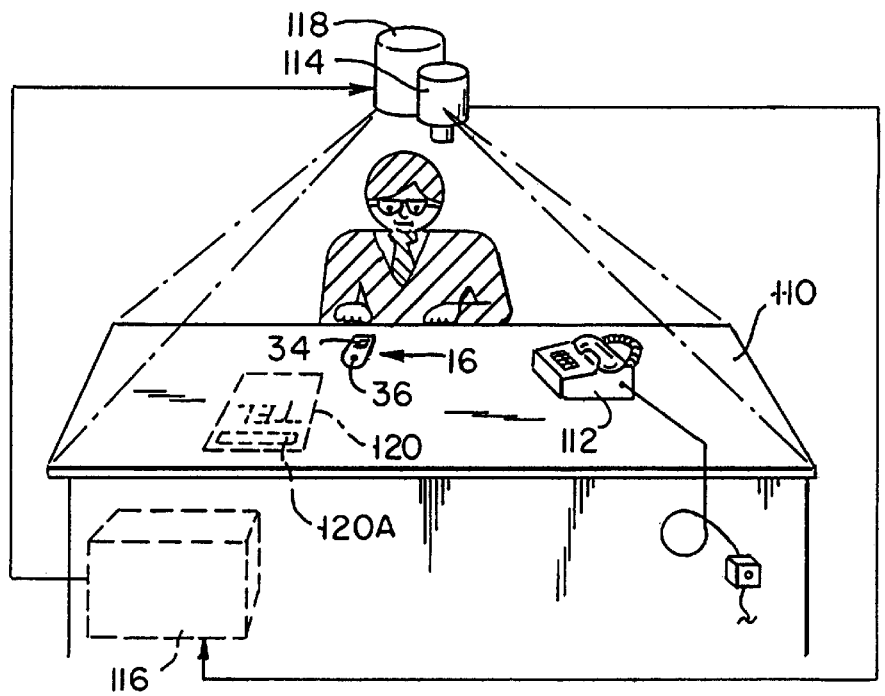

FIGS. 5(A) and 5(B) show a board (desk) 110 constructed in accordance with the second embodiment of the present invention. This board 110 has both a role as a desk for performing normal work and a role as a screen for projecting a picture that is projected by a projector to be described later.

On the board 110 there is an actual telephone 112. Also, above the board 110 there is a camera 114 for photographing the surface of the board 110. A picture signal photographed with the camera 114 is transmitted to a computer 116 corresponding to the board 110. This computer 116 identifies the planar position (coordinates) of a pointing device 16 on the board 110. Also, the telephone 112 is connected to the computer 116 so that the talking state or dialing can be controlled with a signal from the computer 116.

Further, projector 118 as a display device is connected to the computer 116. That is, instead of a monitor that is normally connected to the computer 116, the projector 118 is connected to the computer 116 and projects a picture onto the board 110 in response to a signal output from the computer 116. This projected picture is substituted for a normal monitor screen. In this embodiment, a telephone directory object 120 has been projected as this projected picture.

As a result, the actual telephone 112 and the virtually expressed picture (telephone directory object 120) exist together on the board 110 (see FIG. 5(B)).

The pointing device 16 that physically exists is also mounted on the board 110. This pointing device 16, as in the first embodiment, contains an identifier which corresponds to an object stored on the computer and is provided at its upper surface with an operation button 34 and an LED 36. If the operation button 34 is operated, the LED 36 will light.

Although in this second embodiment the mouse 16 is not necessarily a wireless mouse (if it can move within the range of the board 110), it is preferably wireless in view of the convenience of handling.

In this case, if the button 34 is operated, the LED 36 lights, and the identifier is transmitted therewith. The light emission (along with the modulated identifier) from this LED 36 will be detected with the above-described camera 114, and in the computer 116, the position of the pointing device 16 on the board 110 can be identified. The computer also directly associates the physical pointing device with the object as a function of the transmitted identifier.

The telephone directory object 120 is provided with a closing button 120A. If the above-described pointing device 16 is moved onto this closing button 120A and the operation button 34 is operated to light the LED 36, the computer 116 will determine that the pointing device 16 and the telephone directory object 120 are virtually connected, and as shown in FIG. 5(A), the telephone directory object 120 will be closed and iconized (icon 119), and further it will be replaced with the arrow pointer of the pointing device 16. If in this state the pointing device 16 is moved operating the operation button 34 thereof, the icon 119 will follow the movement of the device 16. If an opening operation (e.g., double clicking) is performed in the iconized state, the telephone directory object 120 will be opened there. If once the telephone directory object 120 is opened, and the pointing device 16 is moved by dragging the title bar of the telephone directory object 120, i.e., with the operation button 34 operated, the projected telephone directory object 120 will also follow this and move on the board 110.

This operation is identical with the operation that when in the state an object is displayed on the monitor of a normal computer and a pointer is displayed, an operator points the title bar of the object with the pointer by using a pointing device, and the point device is moved while the button thereof is being pressed, the object is moved. This operation is also well known, so the detail control of the computer 116 will not be given.

The icon of the virtually connected telephone directory object 120 can be moved to a position on the board 110 that the operator desires by moving the pointing device 16. Also, if double clicks (quickly press the operation button 34 two times) is made in the virtually connected state, the computer 116 will open a virtually connected object (in this embodiment, telephone directory object 120) and project the content onto the board 110.

Now, in the state the object is open, the pointing device 16 has the same function as the pointer, so by putting the pointing device 16 upon the menu item of the object content and clicking it, the execution of the command upon which the pointing device 16 was put can be instructed to the computer 116. In the second embodiment, as the command of the telephone directory object 120 there are the registration, retrieval, and automatic dialing of telephone numbers.

The operation of the second embodiment will hereinafter be described.

When the telephone directory object 120 registered in the computer 116 is used as an operator telephones with the telephone 112, the pointing device 16 is first moved onto the projected telephone directory object 120. At this time, the telephone directory object 120 and the pointing device 16 have not been connected virtually, so only the pointing device 16 moves and it is moved onto the projected telephone directory object 120.

The operation button 34 of the pointing device 16 is operated on the closing button 120A of the telephone directory object 120. With the operation, the LED 36 is lit, and the lit position is identified through the camera 114 by the computer 116.

In the computer 116 the photographed position (position of the telephone directory object 120) has been identified in advance, and if it is determined that this position and the position of the pointing device 16 corresponded to each other, they will virtually be connected to change the pointer to the icon 119 of the telephone directory object 120.

Thereafter, the projected position of the icon 119 of the telephone directory object 120 follows the movement of the pointing device 16 during the operation of the operation button 34, so the position of the icon 119 can be moved. For this reason, the operator moves the telephone directory object 120 to a position where it is easy to handle, and then clicks the operation button 34 two times.

With this operation, the telephone directory object 120 is opened and the content is projected. At this point of time, the pointing device 16 becomes the pointing device of the system, and the pointer becomes an arrow.

Figure 6:
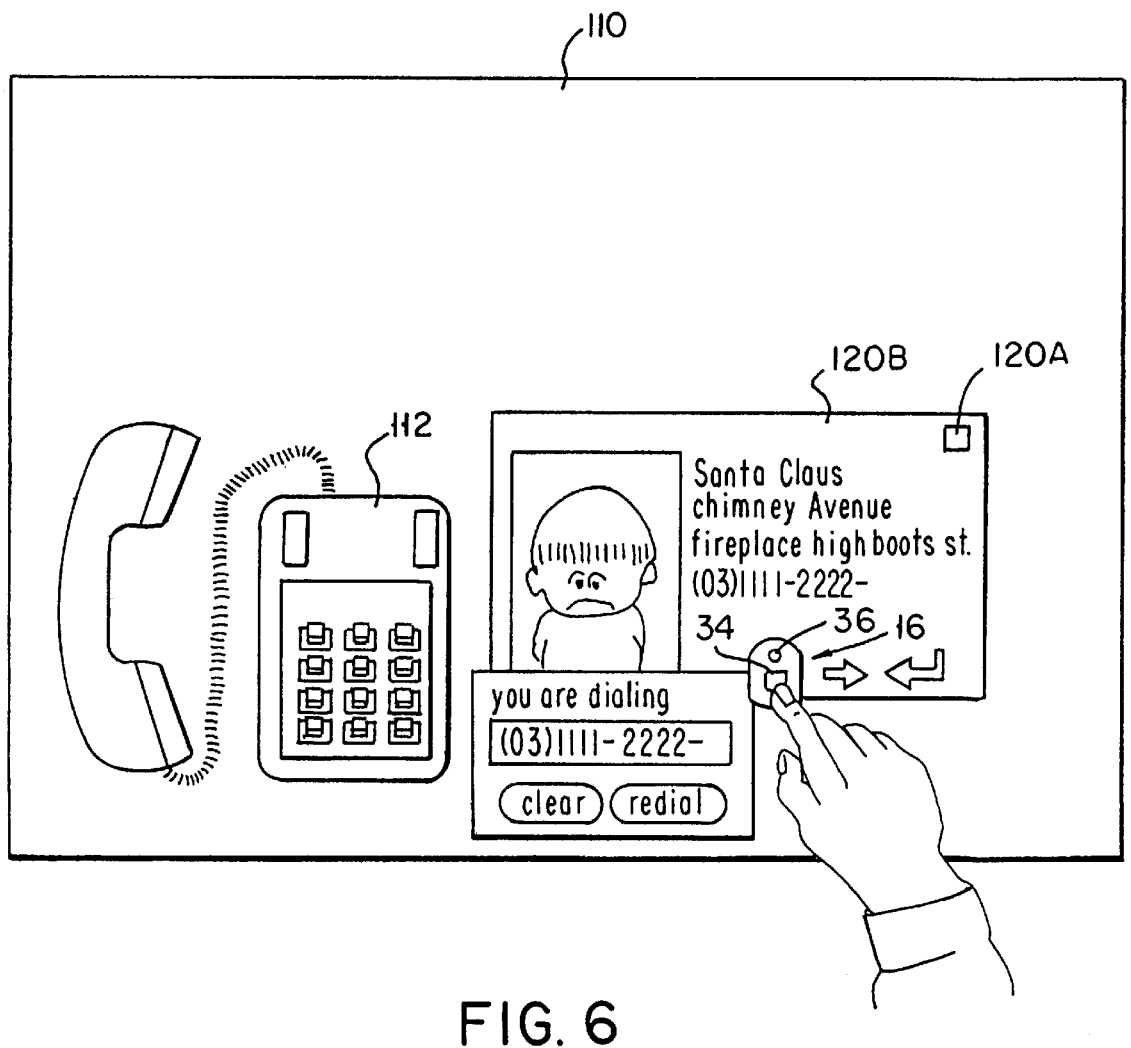
FIG. 6 is a plan view showing an example of one window projection in a telephone directory object.

If a retrieval command is searched from the content of the opened telephone directory object 120, and the pointing device 16 is moved onto this retrieval menu item and clicked, a projection needed for retrieval will be made. For example, other projection such as an input request of the initial letter of a name or a list display is made. If the operator views this projection and performs required input or specification, the projection will be further developed to project a window 120B showing the telephone number, address, photograph and the like of a person that you are going to call (FIG. 6).

If the operator confirms this and specifies and executes a dial command, the telephone 112 connected to the computer 116 will automatically be controlled, the dialing operation will be started, and the operator will be able to talk.

If the talking is completed, the operator will be able to project the original icon of the telephone directory object 120 by closing the projections developed in sequence. By moving the pointing device 16 onto a predetermined position on the board 110, with the operation button 34 operated, the icon of the telephone directory object 120 follows the movement of the pointing device 16, and can be stored in a suitable position on the board 110, for example.

Thus, by virtually connecting the pointing device 16 physically existing on the board 110 and the projected picture (telephone directory object 120), the operator can handle as actual feeling this projected picture as if he or she is searching telephone numbers with the use of a telephone directory that actually exists there, so-called virtual reality can be realized.

Note that in the second embodiment, the actual telephone 112 and the telephone directory object 120 have been described as an example, but when a plurality of objects are projected on the board 110, the pointing device 16 can virtually be connected with a necessary object by an operation of connecting the device 16 to the respective objects.

Also, a plurality of pointing devices 16 may virtually be connected with a plurality of objects, respectively.

A third embodiment of the present invention will hereinafter be described. For the same parts as the above-described first embodiment, the same reference numerals will be applied and a description of the same parts will not be given.

Figure 7:
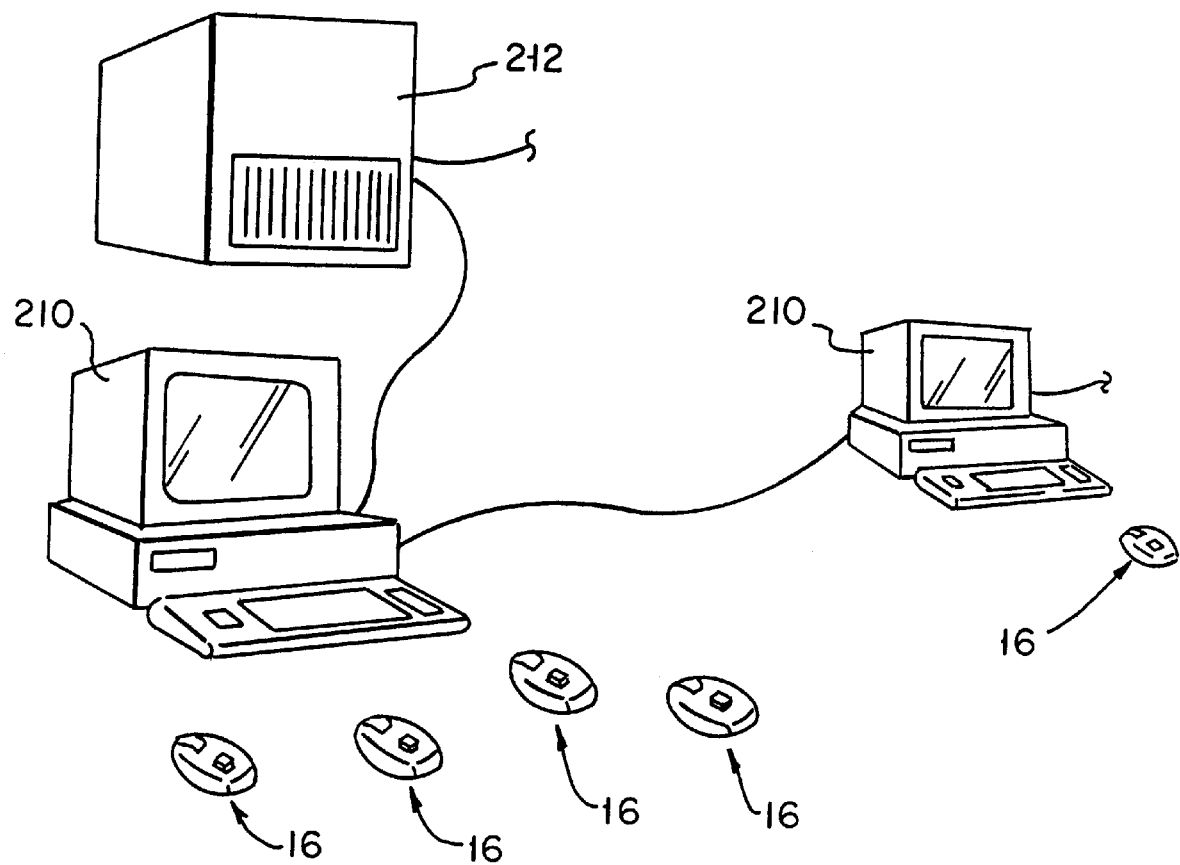
FIG. 7 is a schematic view showing a computer network system according to a third embodiment of the present invention.

FIG. 7 shows a plurality of terminal computer 210 networked. These terminal computer 210 are connected to the host computer 212 so that they can freely access the host computer 212.

In correspondence with the terminal computer 210, there are a plurality of wireless mice 16, the number of which is equal to or more than that of the terminal computer 210. (When the wireless mice 16 are shown individually, "A", "B" . . . will hereinafter be applied after "16".)

Each wireless mouse 16 is provided with an operation button 34 and an LED 36 and has a specific ID.

Figure 8:
FIG. 8 is a diagram showing a corresponding map of ID-object.

Now, in the host computer, this ID and a predetermined object have been connected in advance. More particularly, as shown in FIG. 8, one wireless mouse 16A is virtually connected with a telephone directory object, and other one wireless mouse 16B is virtually connected with a customer list object.

The wireless mice 16 are usually stored in a predetermined place. Now, when the operator operates the terminal computer 210, he or she picks up a wireless mouse 16A connected with a necessary object and goes near a vacant terminal computer 210.

If the operation button 34 is operated in front of a predetermined terminal computer 210, a light signal based on the ID will be output from the LED 36 and received by a light-receiving part 40 of the terminal computer 210.

If the terminal computer 210 receives the light signal, the host computer 212 will retrieve an object corresponding to the ID and display the icon of the corresponding object onto a monitor 42 of the terminal computer 210 that received the light signal.

The operator can open this object by clicking the operation button 34 of the wireless mouse 16A twice, and thereafter, the wireless mouse 16A will have a role as a pointing device for moving a pointer.

The operation of the third embodiment will hereinafter be described.

A plurality of wireless mice 16 have been arranged and stored in a predetermined place. When the operator operates the terminal computer 210, he or she picks up a wireless mouse 16A corresponding to a necessary object. This wireless mouse 16A has virtually been connected with a predetermined object.

If the operator sits in front of the terminal computer 210 and operates the operation button 34 of the picked-up wireless mouse 16A, the LED 36 will emit light and this light will be received by the light-receiving part 40 of the terminal computer 210. The received light signal contains the ID, so the host computer retrieves the object virtually connected with this ID and displays the icon of that object onto the monitor 42 of that terminal computer 210.

The operator views the displayed content to confirm that it corresponds with a desired object and then clicks the operation button 34 twice to open this object and start work.

If the object is closed at the time the work has been completed, the display of this object onto the monitor 42 will be changed to the icon and the content of the work will be stored in the host computer. Also, the operator returns the wireless mouse 16A back to the predetermined place.

Thus, by virtually connecting the wireless mice 16 to different objects, respectively, and by operating a necessary wireless mouse 16 in front of the terminal computer 210, the objects can easily be opened.

Also, by controlling and storing these wireless mice 16, the objects virtually connected to the wireless mice 16 would not be opened even if they were tried to be opened with the terminal computer 210, and the secret of important objects can be held.

That is, carrying the wireless mouse 16 becomes the same operation as carrying files actually, so the security of important files can be enhanced. For example, in a case where the terminal computer 210 is installed in a conference hall and important documents have to be carried to the conference hall, the important documents can be taken out with the terminal computer 210 of the conference hall by putting the wireless mouse 16 in a pocket and carrying it.

As has been described hereinbefore, the control method and system for an object on a computer according to the present invention has the excellent advantage that the object on the computer can virtually be connected with a real work as if they were physically connected, thereby enhancing ease of operation.

While the invention has been described in terms of a preferred embodiment, those skilled in the art will recognize that the invention can be practiced with modification within the spirit and scope of the appended claims.

Having thus described my invention, what I claim as new and desire to secure by Letters Patent is:

1. In a computer system having a display device, a memory storing an object including associated data, and a physical pointing device wherein an identifier is stored corresponding with said object, a method for controlling said object in said computer system, comprising the steps of:
   displaying an image corresponding to said object onto said display device;
   communicating said identifier corresponding with said object to said computer system, responsive to user input to said physical pointing device wherein said identifier is stored;
   directly associating said physical pointing device with said object as a function of said identifier;
   displaying said associated data, responsive to user input to said physical pointing device and said step of directly associating; and
   executing a command instruction with respect to said associated data.

2. The method of claim 1, comprising the step of positioning the image as a function of a position of said physical pointing device, responsive to said step of associating.

3. The method of claim 1 wherein said physical pointing device is one of a plurality of physical pointing devices and said object is one of a plurality of objects having associated data stored in memory, each one of said plurality of physical pointing devices including a unique identifier (ID) which corresponds to one of said plurality of identifiers.

4. The control system for an object stored on a computer as set forth in claim 3, wherein said network system is installed in a museum having a plurality of booths and said physical pointing device is given to visitors entering said museum.

5. The method of claim 1 wherein said step of directly associating comprises the step of identifying and comparing a physical planar position of said physical pointing device with a predetermined displayed position of said image.

6. A control system for objects stored on a computer, comprising:
   a physical pointing device having an input and an output, said physical pointing device having a unique identification (ID) coded therein which said physical pointing device outputs responsive to said input;
   a network system including:
      a host computer coupled by a network line to a plurality of terminal computers each of which has a display device; and storage means for storing an object corresponding to said ID, said object including at least readable information;
      detecting means, associated with at least one of said plurality of terminal computers, for calling said object into a called state onto said at least one of said terminal computers when said physical pointing device outputs said ID; and
      access means for opening said object in said called state, responsive to said input;
      wherein said physical pointing device includes a pointing function that can instruct a command execution of said object, responsive to said access means.

7. The control system of claim 6, wherein said object in said called state has been related to said physical pointing device, and an image corresponding to said object is displayed on said display device, said image having an image position which is a function of a position of said physical pointing device.

8. The control system of claim 6, wherein said access means comprises an edit function for editing said readable information.

* * * * *